(12) United States Patent
Aoyama

(10) Patent No.: US 6,509,869 B2
(45) Date of Patent: Jan. 21, 2003

(54) GPS RECEIVER

(75) Inventor: Akihiro Aoyama, Shizuoka-ken (JP)

(73) Assignee: Jatco TransTechnology Ltd., Fuji (JP)

( * ) Notice: Subject to any disclaimer, the term of this patent is extended or adjusted under 35 U.S.C. 154(b) by 0 days.

(21) Appl. No.: 09/989,197

(22) Filed: Nov. 21, 2001

(65) Prior Publication Data

US 2002/0063655 A1 May 30, 2002

(30) Foreign Application Priority Data

Nov. 24, 2000 (JP) ........................................ 2000-357030

(51) Int. Cl.[7] .............................. G01S 5/14; G01C 21/30
(52) U.S. Cl. .................................. 342/357.13; 701/208
(58) Field of Search ....................... 342/357.06, 357.12, 342/357.13; 701/208, 213, 215

(56) References Cited

U.S. PATENT DOCUMENTS

| | | | | |
|---|---|---|---|---|
| 5,646,629 A | * | 7/1997 | Loomis et al. ............... 342/357 |
| 6,024,655 A | * | 2/2000 | Coffee ......................... 473/407 |
| 6,381,537 B1 | * | 4/2002 | Chenault et al. ............ 701/209 |
| 6,385,536 B2 | * | 5/2002 | Kimura ....................... 701/209 |
| 6,415,224 B1 | * | 7/2002 | Wako et al. ................. 701/208 |
| 6,421,002 B2 | * | 7/2002 | Krasner ..................... 342/357.1 |
| 6,434,481 B2 | * | 8/2002 | Winter et al. ............... 701/208 |

* cited by examiner

*Primary Examiner*—Dao Phan
(74) *Attorney, Agent, or Firm*—Blank Rome Comisky & McCauley, LLP

(57) ABSTRACT

Disclosed herein is a GPS receiver, which is equipped with a position measuring section and a central control section. The position measuring section functions as a reception section that receives electronic radio waves from GPS satellites. The position measuring section also functions as a self-position information acquisition section that acquires self-position information, based on the received radio waves. The position measuring section further functions as a satellite information acquisition section that acquires satellite information on a position of each GPS satellite, based on the received radio waves. The central control section functions as a game character generation section that generates game characters. The central control section also functions as a game character position control section that controls a position of each game character, based on the self-position information and the satellite information. The central control section further functions as a display unit that displays the game characters at the controlled positions.

2 Claims, 9 Drawing Sheets

(a)

(b)

(c)

GPS RECEIVER

BACKGROUND OF THE INVENTION

1. Field of the Invention

The present invention relates to a GPS receiver, and more particularly to a GPS receiver that performs specification of a self-position and navigation such as route guidance and displays the results graphically on a plane display such as a liquid crystal display.

2. Description of the Related Art

GPS receivers take advantage of a global positioning system (GPS) to obtain positional information (latitude, longitude, etc.). The positional information is displayed as character information, or is displayed on a map as a self-position mark. Since GPS receivers have high measurement accuracy (about a few ten meters), they are widely used in a vehicle navigation system, a portable navigation system, etc. However, the conventional GPS receivers are limited to the specification of a self-position and navigation function such as route guidance, etc. In the situation in which such applications are not needed, the conventional GPS receivers are seldom utilized. Particularly, for portable GPS receivers, they are likely to become loads.

SUMMARY OF THE INVENTION

The present invention has been made in view of the circumstances mentioned above. Accordingly, it is the primary object of the present invention to realize a GPS receiver that is capable of enhancing utilization value by having a function other than the navigation function.

To achieve this end, there is provided a GPS receiver comprising reception means for receiving electronic radio waves from a global positioning system (GPS) satellites; self-position information acquisition means for acquiring self-position information, based on the electronic radio waves received by the reception means; and satellite information acquisition means for acquiring satellite information on a position of each of the GPS satellites, based on the electronic radio waves received by the reception means. The GPS receiver further comprises game character generation means for generating a plurality of game characters; game character position control means for controlling a position of each of the plurality of game characters, based on the self-position information and the satellite information; and display means for displaying the game characters at positions controlled by the game character position control means.

According to the present invention, the GPS receiver is equipped with the game function that employs game characters. The movement of each game character is controlled based on the positional information on GPS satellites. Therefore, the GPS receiver of the present invention has a useful function other than the navigation function and thereby enhances its utilization value.

In a preferred form of the present invention, the GPS receiver further comprises game processing means, which sets a quiz when a plurality of game characters are in a predetermined positional relationship, and then increases or decreases game points, based on an answer to the quiz. In this case, the degree of difficulty of a game can be controlled according to the content of a quiz.

BRIEF DESCRIPTION OF THE DRAWINGS

The above and other objects and advantages will become apparent from the following detailed description when read in conjunction with the accompanying drawings wherein.

DETAILED DESCRIPTION OF THE PREFERRED EMBODIMENTS

Figure 1:
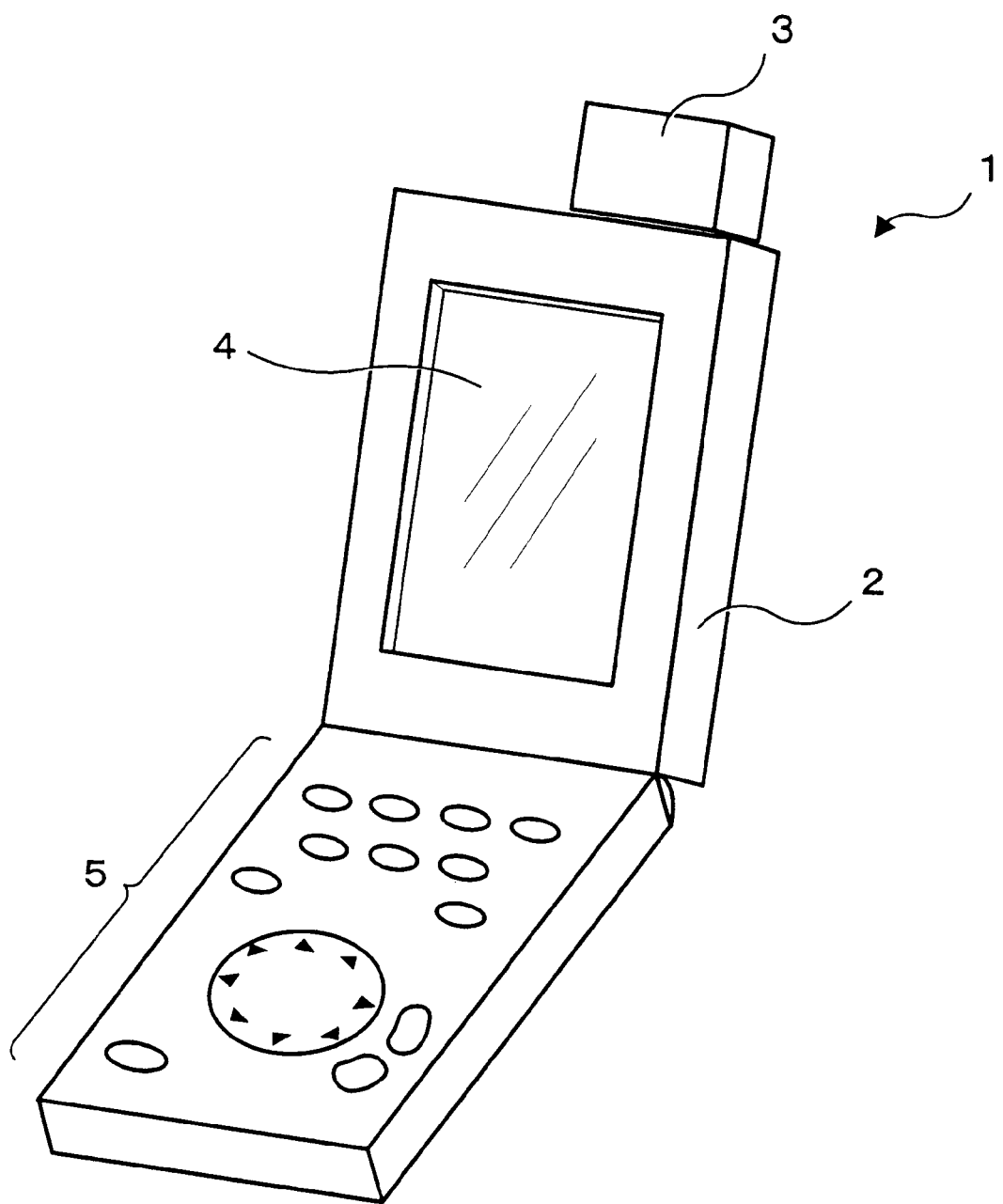
FIG. 1 is a schematic diagram showing a GPS receiver constructed according to a preferred embodiment of the present invention.

Ref erring now in greater detail to the drawings and initially to FIG. 1, there is shown a GPS receiver 1 in accordance with a preferred embodiment of the present invention. The GPS receiver 1 is equipped with a portable case 2 (although the illustrated example is of a folding type, the present invention is not limited to this), a GPS antenna 3, a liquid crystal display (display means) 4, and a key control section 5.

The GPS antenna 3 is an antenna element for receiving electronic radio waves for a global positioning system (GPS). The electronic radio waves are position measuring radio waves (among which, a commercial radio wave is a radio wave L1 of wavelength 19 cm) that are emitted from 24 satellites circling along 6 orbits of altitude about 20200 km above the earth and inclination angle 55° in about 12 hours, as described later. In the GPS, electronic radio waves from a plurality of satellites are received at all regions on the earth, and the coordinates (two-dimensional positional information consisting of latitude and longitude, or three-dimensional positional information consisting of latitude, longitude, and altitude) of a position on the earth are specified based on the received information.

The liquid crystal display 4 has resolution to the degree that an image and information (a character, etc.) can be displayed. It is preferable that the liquid crystal display 4 be a color liquid crystal display panel. The key control section is equipped with a power switch for the GPS receiver 1, and various function keys, a menu key, a scroll key, and a zoom key which are employed for navigation and other functions.

Figure 2:
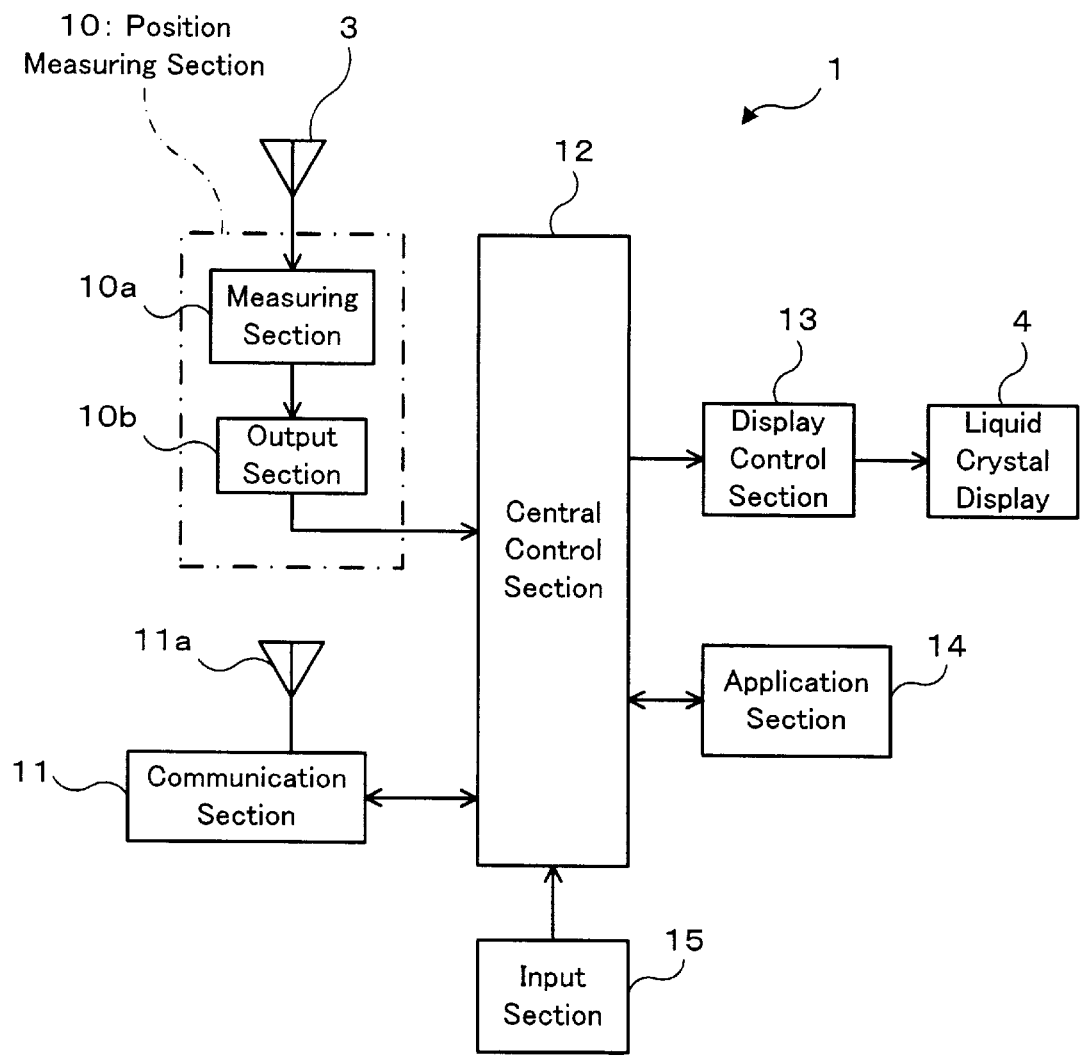
FIG. 2 is a conceptual block diagram showing the electrical construction of the GPS receiver of the preferred embodiment.

FIG. 2 shows the electrical construction of the GPS receiver 1. As shown in the figure, the GPS receiver 1 is constructed of a position measuring section 10 (reception means, self-position information acquisition means, and satellite information acquisition means), a communication section 11, a central control section 12 (game character generation means, game character position control means, display control means, and game processing means), a display control section 13 (display control means), an application section 14, and an input section 15. The functions of the sections are as follows.

The position measuring section 10 consists of a measuring section 10a and an output section 10b. The measuring section 10a specifies the position (at least two-dimensional coordinate position consisting of latitude and longitude) of the GPS receiver 1 on the earth by analyzing the electronic radio waves from the GPS satellites, received with the GPS antenna 3. The output section 10b converts the specified positional information or satellite information (satellite number, satellite position, etc.,) to a predetermined format and outputs it to the central control section 12.

The position measuring accuracy of the GPS is about 100 to 300 m with the selective availability (SA) (which is the function of intentionally decreasing accuracy at the request of the Department of Defense) on and is about a few meters to a few ten meters with the SA off. Furthermore, even when a differential GPS (which is a method of correcting for an error by employing data received from a base station) is employed, the same accuracy is obtained.

The position measuring principle of the GPS is as follows: For example, assume that the positions of 3 satellites A, B, and C are known. If a distance from the satellite A to the position of the GPS receiver 1 is assumed to be a, the GPS receiver 1 is situated at a certain point on the surface of the sphere A' of radius a with the satellite A as center. At the same time, if a distance from the satellite B to the position of the GPS receiver 1 is assumed to be b, the GPS receiver 1 is situated at a certain point on the circumference where the sphere A' with a radius of a and the sphere B' with a radius of b overlap each other. Furthermore, if a distance from the satellite C to the position of the GPS receiver 1 is assumed to be c, the position of the GPS receiver 1 is situated at the intersection between the spheres A', B', and C'. In an actual measurement, a signal is received from the fourth satellite and used for a correction of time shift. Note that although the position of a satellite is expressed by an orthogonal coordinate system fixed to the earth, it can be calculated by employing the 6 calculation parameters of orbital information transmitted from satellites (6 orbital elements: long radius, eccentricity, mean anomaly, orbital inclination, north-bound node longitude, and perigee argument).

The display control section 13 drives the liquid crystal display 4 according to a display signal output from the central control section 12 so that a map, self-position information, route information,etc.,are displayed on the screen. In addition, during execution of a game function to be described later, various information related to the game function are displayed. Furthermore, GPS reception management information is displayed for system management as occasion demands.

Figure 3:
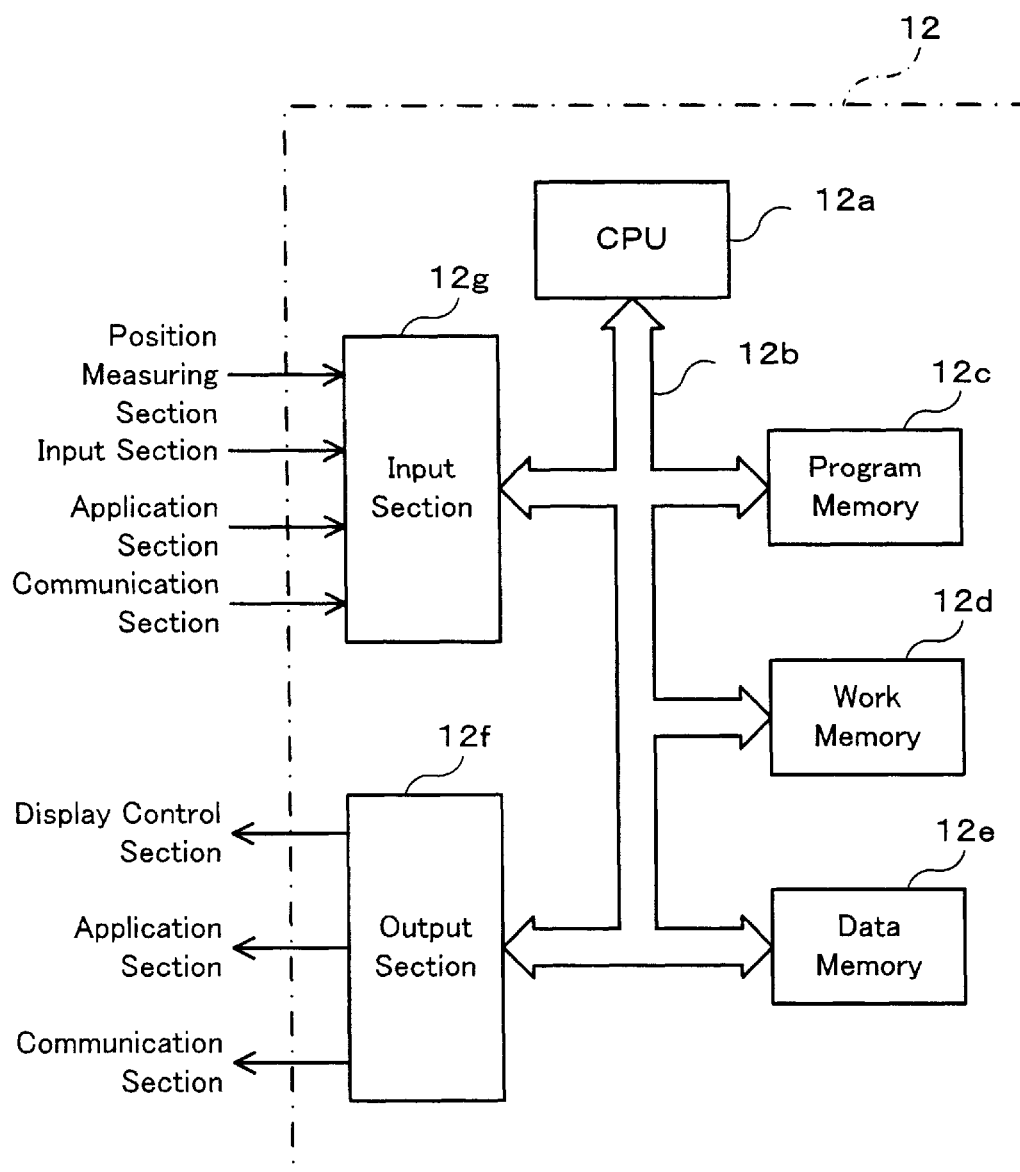
FIG. 3 is a conceptual block diagram of the central control section of the GPS receiver of the preferred embodiment.

The central control section 12 controls the entire operation of the GPS receiver 1. As shown in FIG. 3, the central control section 12 is equipped with a central processing unit (CPU) 12a. The CPU 12a is connected with a program memory 12c, a work memory 12d, a data memory 12e, an output section 12f, and an input section 12g through a bus 12b. The CPU 12a realizes the navigation function, the game function, etc., by reading out the operating system stored in the program memory 12b, a user application program to be described later, and the data, then executing them on the work memory 12d, and then organically coupling these software resources with hardware resources such as the CPU 12a, etc.

The application section 14 is a fixed or detachable storage device and stores a navigation program and necessary data (map data, etc.,) for realizing the navigation function, and stores game programs and necessary data (game character data, etc.,) for realizing the fame function.

It is desirable that the communication section 11 be mounted in the GPS receiver 1. Between the GPS receiver 1 with this communication section 11 and another GPS receiver with a communication section, data can be transmitted or received through the antenna 11a. In addition, the position confirmation of the other GSP receiver and the position notification to the other GPS receiver can be performed. Furthermore, the result of a game to be described later can be transmitted or received between GPS receivers.

Next, operation of the GPS receiver 1 will be described.

Initially, a description will be given of the navigation function of the GPS receiver 1. If a user selects the navigation function with the input section 15 of the GPS receiver 1, the CPU 12a acquires the present positional information from the position measuring section 10. Then, the CPU 12a reads out a wide area map or detailed narrow area map containing the acquired position, from the application section 14, and sends it to the display control section 13. The map is displayed on the liquid crystal display 4. Furthermore, the CPU 12a performs a present-position display process to display a predetermined present position mark at the present position obtained from the above-mentioned positional information, and also performs auxiliary processes (route prediction, altitude display, heading display, moving-speed display, etc.,) required for route guidance.

The navigation function is used in conventional car navigation systems and portable navigation systems. However, the GPS receiver 1 of the preferred embodiment, in addition to the navigation function, has the game function to be described later.

Figure 4:
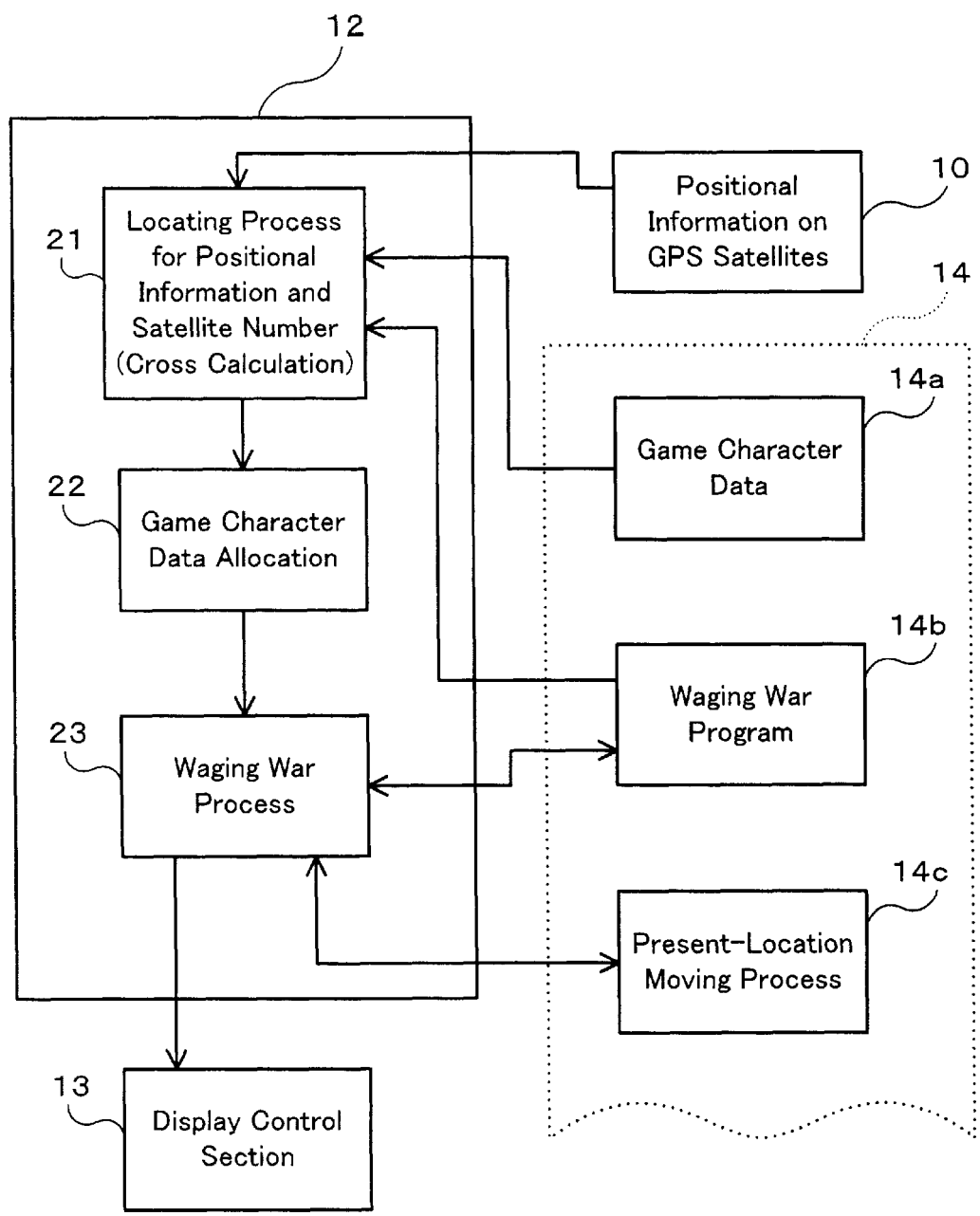
FIG. 4 is a conceptual block diagram showing an example (waging war type game) of the game function of the GPS receiver of the preferred embodiment.

FIG. 4 shows the aforementioned game function. In the figure, the three rectangles 21 to 23 within the central control section 12 are function blocks that are virtually realized by the organic coupling between software resources (such as the operating system stored in the program memory 12c, game programs stored in the application section 14, etc.) And hardware resources provided in the interior of the central control section 12. These function blocks have the following functions.

Figure 5:
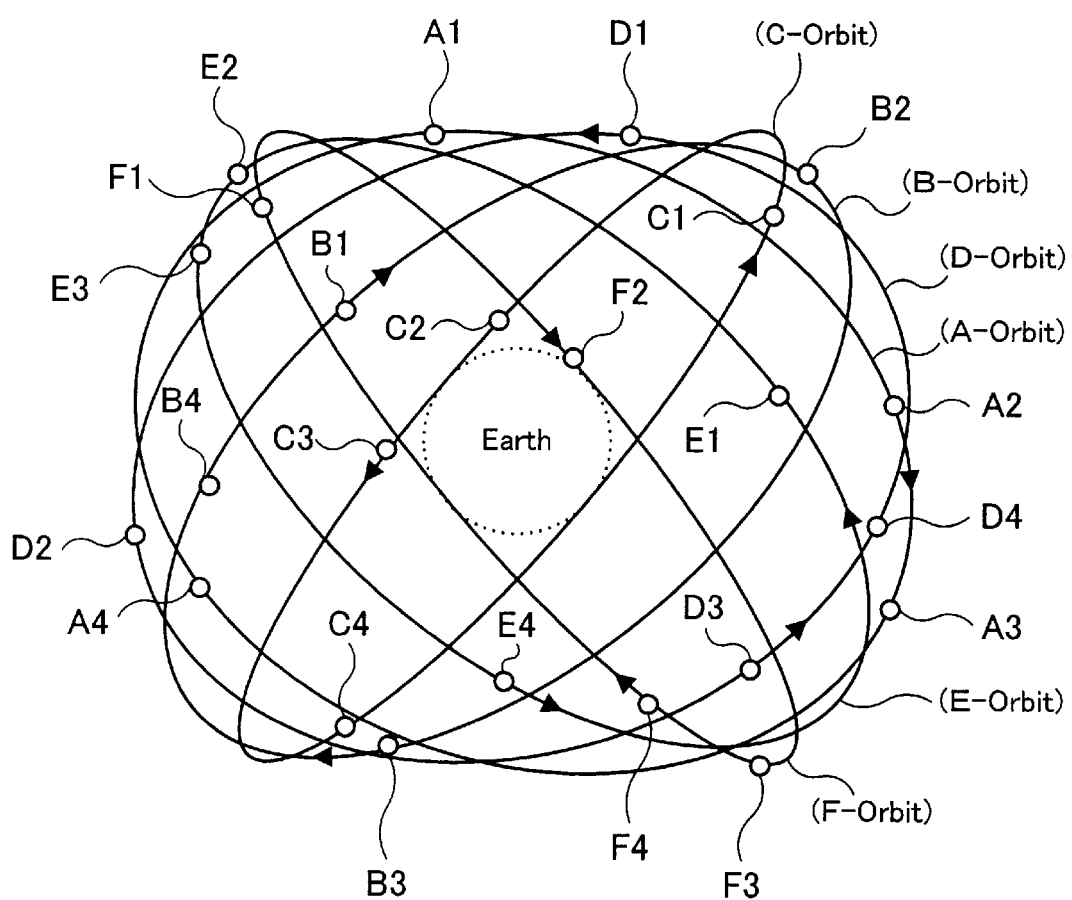
FIG. 5 is a diagram showing the orbits of GPS satellites.

The satellite number location processing section 21 specifies a GPS satellite number in the sky (identification number allocated to each satellite) and the position of a satellite on an orbit, based on the GPS satellite information obtained from the position measuring section 10. FIG. 5 shows an orbit diagram of GPS satellites called a NAVSTAR diagram. In the figure, 4 satellites are always placed in each of the 6 orbits, and each satellite makes its orbit in about 12 hours. Reference characters A1 to A4 denote 4 satellites circling along an A-orbit. Similarly, B1 to B4 denote 4 satellites circling along a B-orbit; C1 to C4 denote 4 satellites circling along a C-orbit; D1 to D4 denote 4 satellites circling along a D-orbit D; E1 to E4 denote 4 satellites circling along an E-orbit; and F1 to F4 denote 4 satellites circling along a F-orbit.

The position of each satellite on its orbit is always controlled, and in all regions on the earth, a two-dimensional measurement (latitude and longitude) or three-dimensional measurement (latitude, longitude, and altitude) can be made almost all day by receiving electronic radio waves from a plurality of satellites (ideally, 5 or more satellites).

Figure 6:
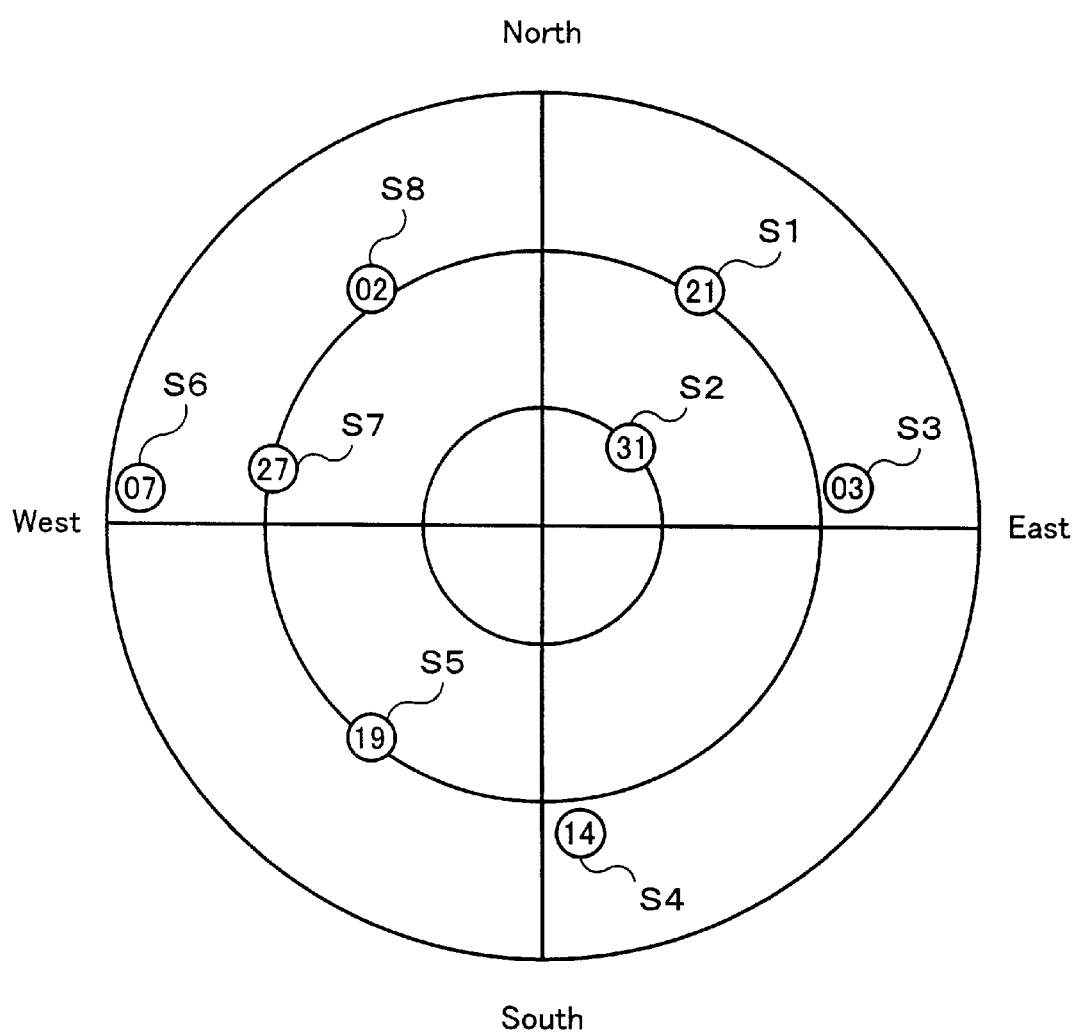
FIG. 6 is a diagram showing the positions of the GPS satellites.

FIG. 6 shows the positions of satellites that can be captured at a specific place on the earth and a specific time. In the figure, the outermost circle corresponds to the horizon, and the center of the concentric circles corresponds to the center of the sky that is seen from the specific place. As shown in the small circles S1 to S8, assume that at the specific place, 8 satellites are positioned in the sky. That is, as indicated by two digit numbers within the circles S1 to S8, assume that 8 satellites having identification numbers 21, 31, 03, 14, 19, 07, 27, and 02 are positioned.

In GPS receivers, such a satellite location diagram (FIG. 6) is known as a GPS reception management information screen. That is, it is employed as a screen for grasping GPS satellites (S1 to S8) that are presently receivable at a specific place or positioned in the sky. A user can grasp the positions, identification numbers, and received states of satellites by displaying the management screen.

The satellite number location processing section 21 of the preferred embodiment is similar to the conventional process of generating the GPS reception management information screen (see FIG. 6), in that it performs a process for grasping GSP satellites (S1 to S8) that are presently receivable at a specific place or positioned in the sky. However, the satellite number location processing section 21 of the preferred embodiment differs in that it performs a process for games, not for management.

That is, the satellite number location processing section 21 grasps the satellite numbers and positions of GPS satellites (S1 to S8), and sends the information to a game character data allocating section 22 along with satellite character data. The game character data allocating section 22 performs a game character data allocating process according to a game program (e.g., a waging war type game program, etc.).

Figure 7:
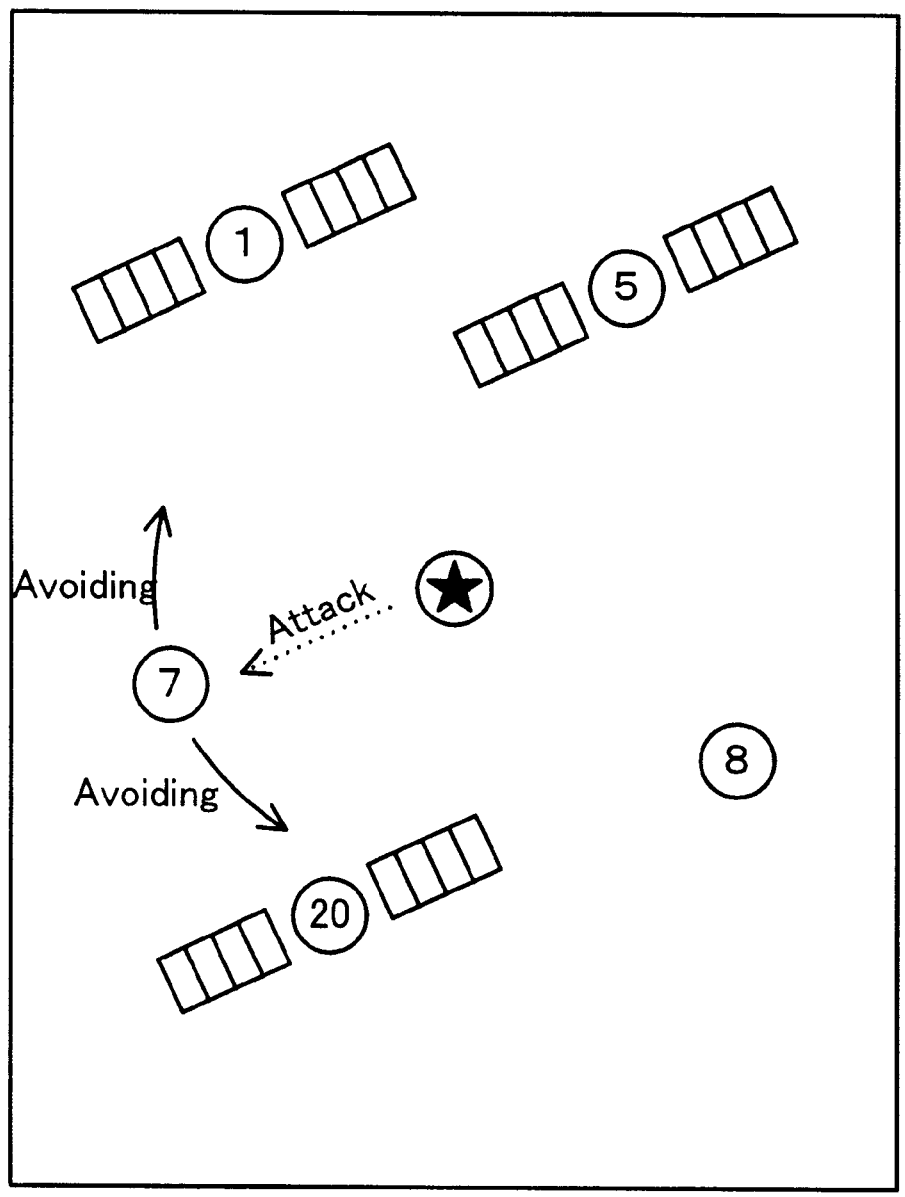
FIG. 7 is a diagram showing game characters displayed on the display screen of the GPS receiver of the preferred embodiment.

FIG. 7 shows game characters allocated by the game character data allocating section 22. In the figure, game characters allocated to GPS satellites having satellite numbers 1, 5, 7, 20, and 8 (which correspond to some of the satellites S1 to S8 of FIG. 6), and a virtual satellite character for a game (game character with a star), are shown. The contents of a game are determined by the game program. For instance, in the case of a waging war type game, game characters may be divided between teams A and B (which oppose each other) to perform an offensive and defensive battle.

In general, in a waging war type game, the game characters of the team B opposing the team A are defeated by controlling a specific game character of the team A. However, some of the conventional waging war type games are devoid of interest, because game characters move only in a programmed manner.

Hence, in the preferred embodiment, the movement of each game character is caused to follow an actual movement of each GPS satellite. Therefore, in order to defend the team A against the attack (missile attack) of the team B, the relative position between the GPS satellites and the position of the GPS receiver 1 must be changed. For this reason, the user has to repeat his movement positively to avoid an attack, while holding the GPS receiver 1. Thus, the present invention is capable of providing a game having sporting activities.

The waging-war processing section 23 of the central control section 12 is a processing section for providing such a game having sporting activities. The waging-war processing section 23 updates the position of each game character as occasion demands, by executing the waging war type program and then grasping the moving direction and moved distance of the user, that is, the moving direction and moved distance of the GPS receiver 1. Thereafter, the waging-war processing section 23 sends the updated screen to the display control section 13 and causes the liquid crystal display 4 to display it.

Thus, in the waging war type game mentioned above, game characters are generated based on the satellite information (satellite number, satellite position, etc.) of the GPS satellites, and movement of the game character is controlled according to the latest satellite information. Therefore, the present invention has the following advantages: the complexity and the degree of difficulty of the game can be enhanced compared with conventional waging war type games used in common game terminals; a more interesting waging-war type game can be provided; and the utilization value of the GPS receiver 1 can be enhanced by having a useful function (game function) other than the navigation function.

Note that the above-mentioned waging war type game can be modified in various ways. For example, in the case where an array of GPS satellites is a characteristic array that seldom occurs, the game can be made more interesting by utilizing the contingency. For instance, when a plurality of satellites are arranged crosswise, these may be named a ground cross, and special bonus points may be added when those satellites are shot down. In this case, if the ground cross is formed on the condition that the total of satellite numbers coincides with a predetermined value, the contingency will be come higher. In addition, the total of the satellite numbers may be bonus points that are added.

In addition, in the above-mentioned waging war type game, if each satellite is given a human name, a virtual world can be realized as if a person-to-person offensive and defensive battle is repeated in the sky. Furthermore, if the GPS receiver 1 is communicated with another GPS receiver through the communicating section 11, game complexity can be enhanced.

Note that there is a possibility that the user will enter a dangerous place, such as rivers, etc., in the heat of his game. To prevent the possibility, it is desirable from the viewpoint of safety that a warning to the user be displayed on the game screen or issued with sound or voice by detecting an approach to such a dangerous place by the use of map information, etc. The contents of the game in the present invention are not limited to the illustrated example. The point is to control the movement of each game character by utilizing satellite information transmitted from GPS satellites. For example, the present invention is also applicable to the following love simulation game.

Figure 8:
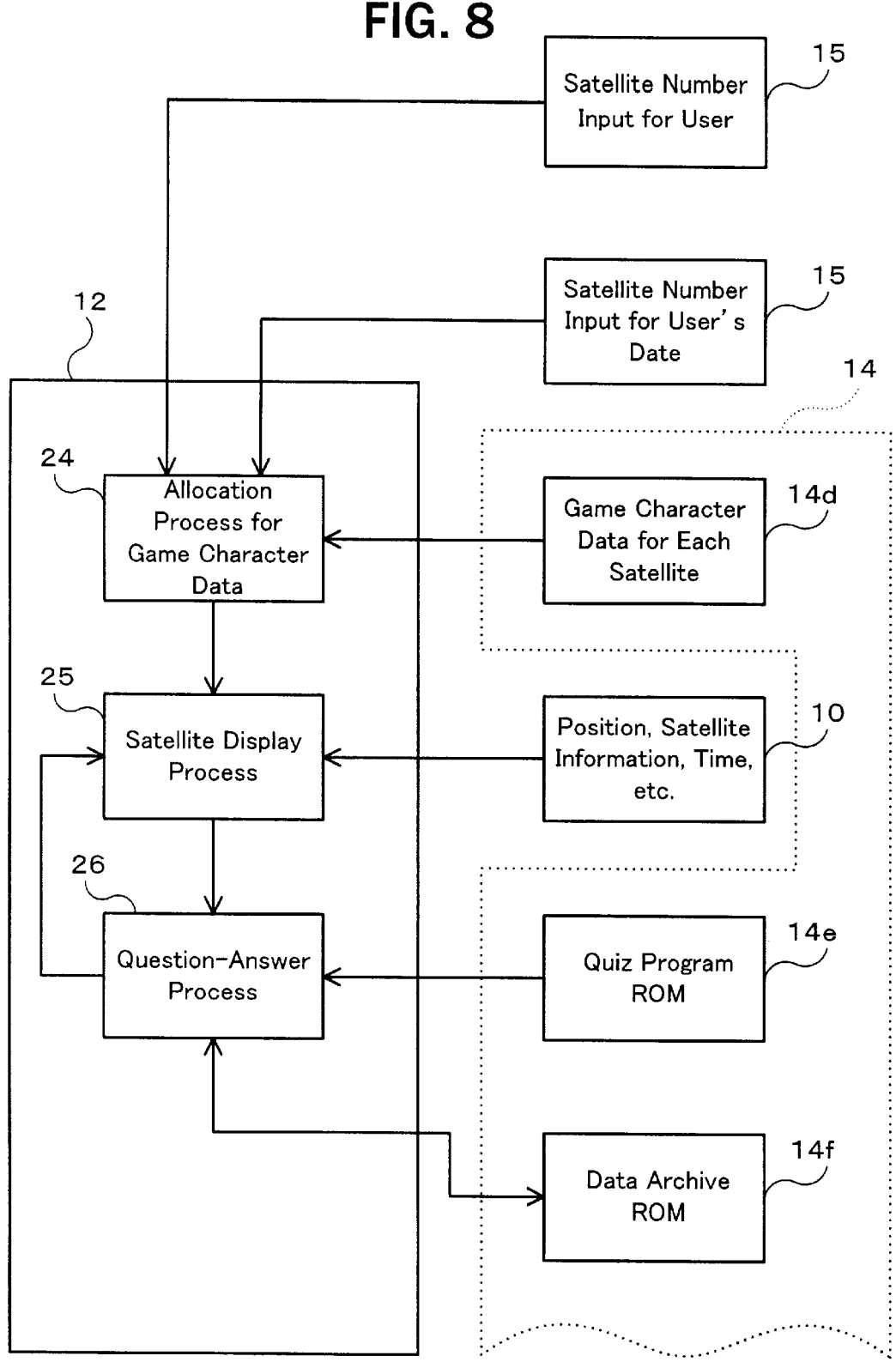
FIG. 8 is a block diagram conceptually showing another example (love simulation game) of the game function of the GPS receiver of the preferred embodiment.

The love simulation game is shown in FIG. 8. In the figure, the three rectangles 24 to 26 within the central control section 12 are function blocks that are virtually realized by the organic coupling between software resources (such as the operating system stored in the program memory 12c, the game programs stored in the application section 14, etc.) and hardware resources provided in the central control section 12. These function blocks have the following functions.

The game character data allocation processing section 24 receives a satellite number representing a user and a satellite number representing a user's date, input through the input section 15 by the user. The game character data allocation processing section 24 also allocates suitable game character data to the respective satellite numbers.

The satellite display processing section 25 specifies a GPS satellite number (identification number allocated to each satellite) in the sky and a satellite position on its orbit, based on GPS satellite information obtained from the position measuring section 10, and updates the position of each game character, based on the specified information.

Figure 9:
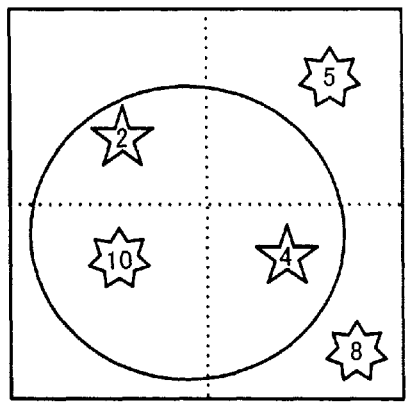
FIG. 9 is a diagram showing game characters in the love simulation game displayed on the liquid crystal display of the GPS receiver of the preferred embodiment.
Figure 9:
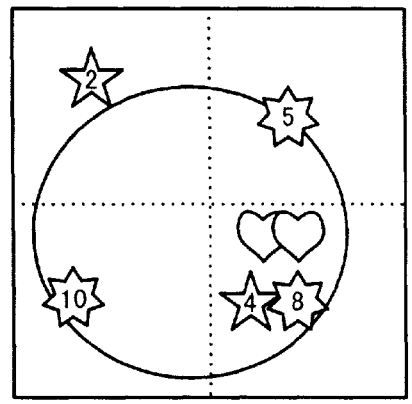
Figure 9:
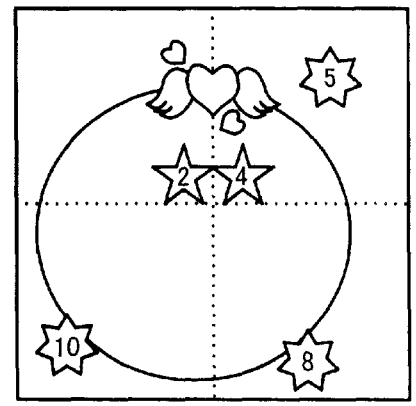

FIG. 9A shows the display screen in which the positional information on each game character has been updated in the aforementioned manner. In the figure, the game character numbered 2 represents the user, and the game character numbered 4 represents the user's date. The game characters numbered 5, 8, and 10 are rival game characters that interfere with the game character 2. Note that if the sex of the game character 2 is male (or female), the game character 4 is female (or male) and the game characters 5, 8, 10 have the same sex as the game character 2. Also, the love simulation game is played inside the circle in FIG. 9, and game characters outside the circle cannot take part in the game.

The question-answer processing section 26 controls the progress of the game. For example, a quiz is given to the user according to the movement of each game character. When the user's answer is right, the correlation points between the user and the user's date are increased. On the other hand, when it is wrong, the correlation points are decreased and the correlation points of the rival game character near the user's date (in the illustrated example, game character 8) are increased. The game may be constructed so that if user's answers are successively wrong, the correlation points between the user's date and the rival exceed a reference value. In this case, the user fails in love (the love game fails).

FIG. 9B shows the situation in which the game fails. In the figure, the user's game character 2 is moved outside the circle. On the other hand, the rival (game character 8) and the user's date (game character 4) are in love with each other.

Conversely, when user's answers are successively right, the user (game character 2) and the user's date (game character 4) are moved toward each other and the game succeeds. That is, as shown in FIG. 9C, the user and the user's date are in love with each other.

In the love simulation game, as with the aforementioned waging war type game, the movement of each game character is controlled according to movements of GPS satellites. Therefore, the user has to repeat his movement positively, while holding the GPS receiver 1. Thus, the present invention is capable of providing a game having sporting activities, and also enhancing the utilization value of the GPS receiver 1 by having a useful function (love simulation function) other than the navigation function.

The above-mentioned love simulation game may employ, for example, the Tale of Star. That is, "Altair" and "Vega" may be employed as a game character for the user and a game character for the user's date, respectively. In this case, a fantasy world will spread and the simulation game can be made more interesting. In the case of the Tale of Star, the season or time that is the background of the tale can be used as an game execution period, and a heartrending element can be added to the game.

While the present invention has been described with reference to the preferred embodiment thereof, the invention is not to be limited to the details given herein, but may be modified within the scope of the invention hereinafter claimed.

What is claimed is:

1. A GPS receiver comprising:

reception means for receiving electronic radio waves from a global positioning system (GPS) satellites;

self-position information acquisition means for acquiring self-position information, based on said electronic radio waves received by said reception means;

satellite information acquisition means for acquiring satellite information on a position of each of said GPS satellites, based on said electronic radio waves received by said reception means;

game character generation means for generating a plurality of game characters;

game character position control means for controlling a position of each of said plurality of game characters, based on said self-position information and said satellite information; and display means for displaying said game characters at positions controlled by said game character position control means.

2. The GPS receiver as set forth in claim 1, further comprising game processing means for setting a quiz when said plurality of game characters are in a predetermined positional relationship and then increasing or decreasing game points, based on an answer to said quiz.

\* \* \* \* \*